United States Patent
Tanton et al.

[11] 4,027,948
[45] June 7, 1977

[54] LOW LOSS LASER MODULATOR

[75] Inventors: George A. Tanton; Harry C. Meyer, both of Huntsville, Ala.

[73] Assignee: The United States of America as represented by the Secretary of the Army, Washington, D.C.

[22] Filed: Mar. 15, 1976

[21] Appl. No.: 667,226

[52] U.S. Cl. .................................. 350/151
[51] Int. Cl.² ............................... G02F 1/09
[58] Field of Search ...................... 350/151

[56] References Cited
UNITED STATES PATENTS

| | | |
|---|---|---|
| 1,678,132 | 7/1928 | Skala .................... 350/151 |
| 3,289,001 | 11/1966 | Wilcox .................. 350/151 |
| 3,936,748 | 2/1976 | Bomke .................. 350/151 |

*Primary Examiner*—John K. Corbin
*Assistant Examiner*—Richard A. Rosenberger
*Attorney, Agent, or Firm*—Nathan Edelberg; Robert P. Gibson; Robert C. Sims

[57] ABSTRACT

Laser light is polarized and sent through a low loss rotator. The amount of rotation is modulated by a modulator source. The laser light is then sent through a further polarizer where its intensity will be modulated in accordance with the variable rotation imparted upon it.

3 Claims, 1 Drawing Figure

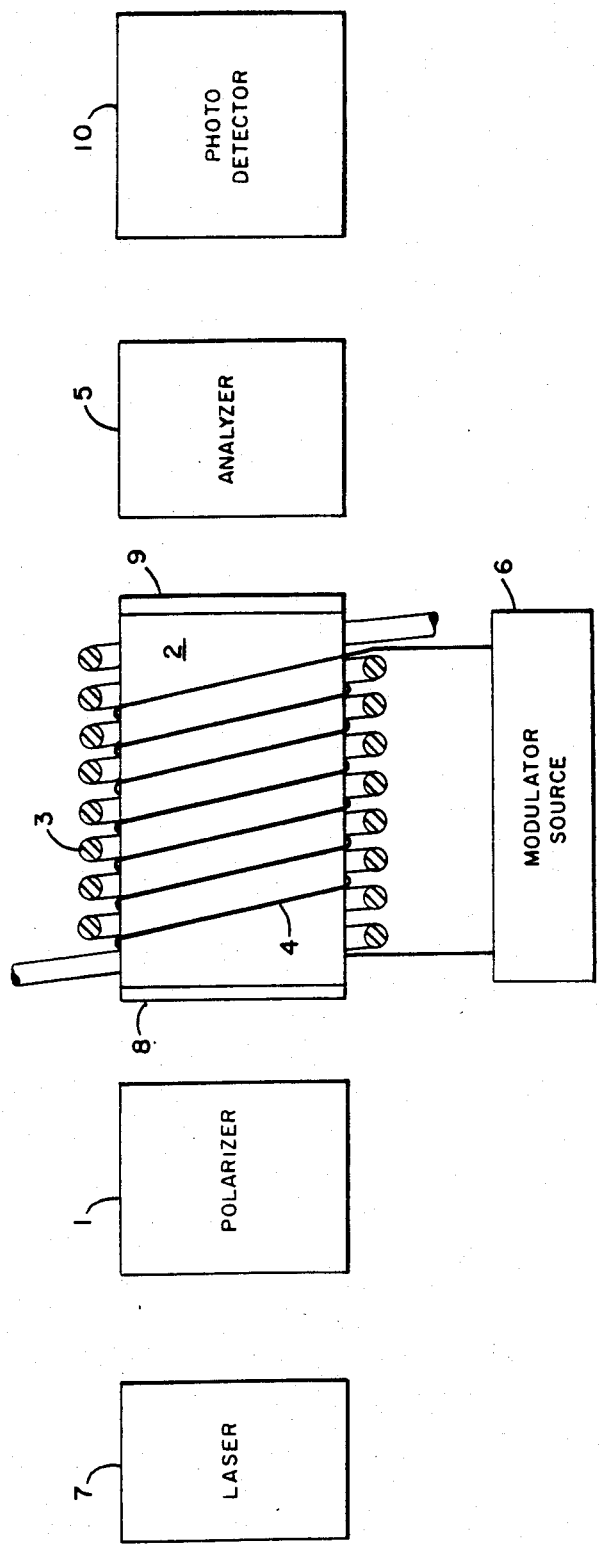

LOW LOSS LASER MODULATOR

DEDICATORY CLAUSE

This invention described herein may be manufactured, used, and licensed by or for the Government for Governmental purposes without the payment to me of any royalties thereon.

BACKGROUND OF THE INVENTION

The modulator in this disclosure is not restricted by the usual limitations of small aperture, low efficiency, and restricted spectral regions of operation common to laser modulators currently under development for optical communications systems, laser radar, and optical data processing. Due to their small linear and angular apertures, and high absorption at wavelengths longer than 1.5 microns, modulators now being tried in visible range laser systems are unsuitable for taking advantage of the powerful $CO_2$ laser which operate at 10.6 microns. These modulators depend upon bulk properties of materials whereas the present modulator works on a different principle. The proposed modulator utilizes the optical properties of narrow absorption lines induced into the material by doping with suitable impurities or due to the molecular structure of the material.

BRIEF DESCRIPTION OF THE DRAWING

The single FIGURE is a diagrammatic showing of the preferred embodiment of the present invention.

DESCRIPTION OF PREFERRED EMBODIMENT

Light of frequency $\omega_o$ from a laser 7 is directed from left to right in FIG. 1 through a polarizer 1, to establish a reference plane of polarization, and onto the modulator material 2. It is necessary to have two narrow absorption lines $\omega_o$ between them, one of which is right circularly polarized and the other left circularly polarized. These lines will give rotation with low absorption at $\omega_o$. To achieve this, an absorption line in the modulator material, which may be a gas with a large magnetic dipole moment (e.g. carbon disulfide, ethylene, oxygen, sulfur dioxide, $NH_3$, or NO) at the same spectral position as the laser light is split into two Zeeman components by an external D.C. biasing magnetic field from super-conducting solenoid 3 which is adjusted so that the Zeeman components are completely separated, i.e., shifted away from $\omega_o$ so that light of this frequency will propagate through the modulator without appreciable absorption from the Zeeman components. The plane of polarization of the plane polarized light will rotate, due to the Zeeman components, as it propagates through the modulator material. This is known as Faraday rotation and is a function of the modulating signal from modulator source 6 applied to coil 4. Due to Faraday rotation, light passing through analyzer 5 from the modulator 2 will have an intensity which is a function of the modulating signal strength. Thus, the signal information is converted to a change in intensity of light emerging from 9. The signal information can be recovered from the light beam after transmission in photo detector 10 by conventional photo detection techniques.

Coil 3 causes an actual magnetic field within the modulated material 2. Coil 3 may be a superconducting solenoid or just a conventional electro magnet. Coil 3 could be replaced by a hollowed permanent magnet placed around the modulating material 2, or electrodes could be used to provide an electro static field perpendicular to the laser radiation so as to produce the stark effect. If a gas is used as the modulated material, then potassium chloride windows 8 and 9 will be provided to contain a gas and allow the passage of the laser radiation. Polarizer 1 and analyzer 5 are both the same and are made up of gold film deposit on a wire grid, or a series of plates stacked at the BREWSTER angle.

In operation, a laser beam from laser 7 will be polarized by polarizer 1 and sent through modulated material 2. Coil 3 will cause the two narrow absorption lines to be formed so as to allow the laser beam to pass through modulator 2 with little loss. Also there will be a rotation of a certain amount caused by the field from coil 3, for example 45°. Anaylzer 5 will be aligned relative to polarizer 1, 40 which is 5° off the ideal condition for passing the polarized laser beam. Modulating source 6 will cause further rotation of the polarized beam either in a positive angle direction or a negative angle direction depending upon the direction of the current from source 6. By design, the modulator source will not cause a rotation of the laser beam more than 5°. The intensity of the laser beam output from analyzer 5 will be directly proportionate to the angle of the laser beam; therefore, the intensity of the laser beam will be modulated in accordance with the signal from modulator source 6. A photo detector will detect this intensity modulation and convert it to a useful signal.

We claim:

1. A system comprising electro-magnetic radiation polarized at a first angle; controlled means for rotating the polarization angle of said radiation; analyzer means for varying the intensity output of said radiation in accordance to the polarization angle; signal means connected to said controlled means so as to cause a change in the polarization angle in proportion to the value of the signal means; said radiation being directed through said controlled means to and through said analyzer means; said electro-magnetic radiation is a beam of laser radiation at a predetermined frequency; polarizer means positioned between said laser radiation and said controlled means so as to provide the polarization of the laser beam; said analyzer is a further polarizer means; said controlled means comprises a modulating material containing two narrow absorption lines either side of said predetermining frequency of said laser beam; and a field producing means for producing a static electro-magnetic field aligned through said modulated material in the direction of said travel of said laser beam.

2. A system as set forth in claim 1 wherein field producing means is a superconducting solenoid wrapped around said modulating material.

3. A system as set forth in claim 1 wherein field producing means will cause a polarization plane shift of a first predetermined number of degrees from said first angle; and said analyzer means having this polarization plane shifted with respect to the first polarizer a number of degrees different from said first predetermined number of degrees by an amount greater than the amount that said signal means can cause additional rotation of said polarization plane.

* * * * *